Oct. 1, 1935.                J. MUVRIN                2,016,019
                          WINDSHIELD HEATER
                       Filed June 13, 1935        2 Sheets-Sheet 1
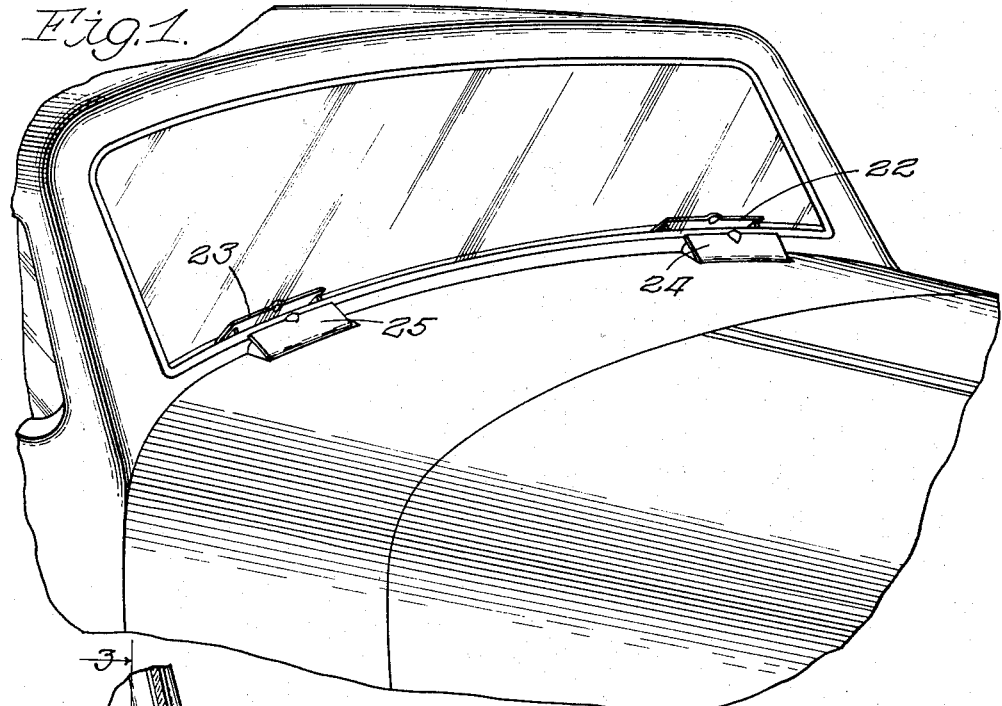

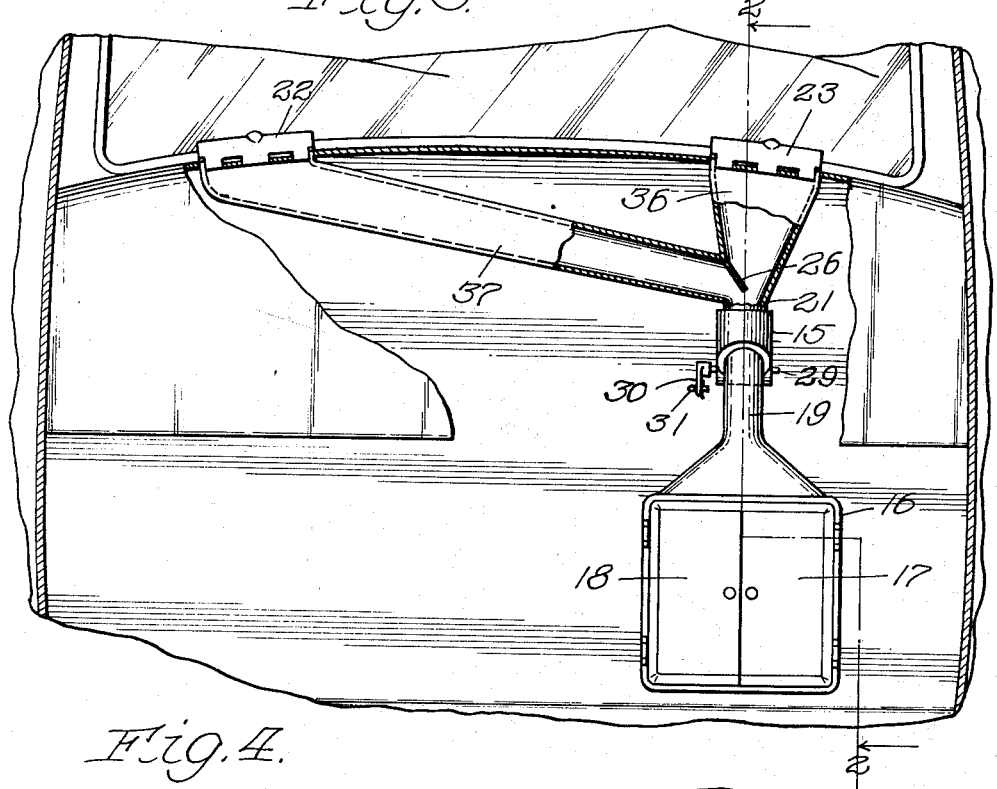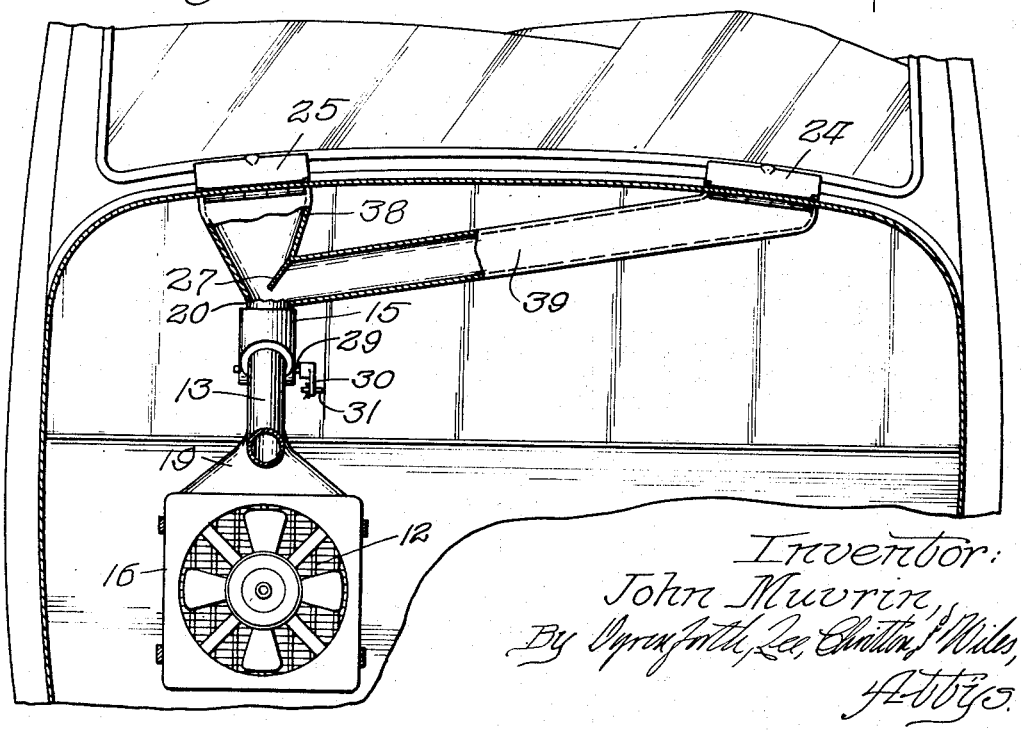

Patented Oct. 1, 1935

2,016,019

UNITED STATES PATENT OFFICE 2,016,019

WINDSHIELD HEATER

John Muvrin, Chicago, Ill.

Application June 13, 1935, Serial No. 26,471

6 Claims. (Cl. 20—40.5)

This invention relates to improvements in windshield cleaners for automobiles or other motor vehicles.

The general object of the invention is to prevent the collection of frost, ice and moisture on the windshields of said vehicles. It has in view the provision of an attachment to heating systems whereby warm air is directed against portions of the windshield for melting accumulations of ice and snow or for evaporating moisture which has accumulated thereon.

A further object of the invention is to provide a windshield cleaner which utilizes warm air from various sources, as from a heater utilizing the heat of the water system and from a heater utilizing warm air direct from the engine.

Another object is to provide a windshield cleaner which applies heat to one or both sides of the windshield from one or more of the several sources, and which may be adjusted in this respect to suit the needs of the occasion.

It is well known that during cold and stormy weather, snow and sleet accumulate on windshields to such an extent that windshield wipers are ineffective to keep the vision clear. The snow and ice has a tendency to form a hard sheet which cannot be effectively dispersed with a wiper. Also in cold weather, when the windows are kept closed, the inside of the windshield frequently becomes coated with frost or moisture and the driver's view is greatly impaired. Operation of a car under such conditions is very dangerous as well as tiring and disagreeable to the driver.

Others have realized these difficulties and dangers and have proposed such remedies as chemical compounds to be rubbed upon the windshield and various mechanical and electrical devices, all of which are subject to objections. The present invention is intended to effectively eliminate the frost and ice on the outside and the moisture on the inside of the windshield, to the satisfaction of the driver, and in such a way as to be free from the objections common to such devices.

Figure 1 is a perspective view of the front end of an automobile showing the means for directing warm air against the windshield; Fig. 2 is a partial longitudinal sectional view showing an embodiment of the invention; Fig. 3 is a section taken on line 3—3 of Fig. 2; and Fig. 4 is a section taken on line 4—4 of Fig. 2.

The embodiment shown in the drawings utilizes warm air from either or both of two sources, a common type of manifold heater referred to as numeral 11, and a type of hot water heater, numeral 12, but it is understood that some other source or sources of warm air may be used.

The warm air supplied by heater 11 is conducted through a pipe 13 which extends from the heater through the partition 14 to a point in front of the instrument board where it connects with a coupling 15.

The hot water heater shown is of a type having a warm air box 16 which is made up of an extension of the sides of the heater and enclosed at the front with small doors 17 and 18 used to control the amount of heat delivered to the car interior. The top of box 16 opens into a pipe 19 which serves to convey the warm air from the heater 12 to the coupling 15.

The coupling 15 is made of some suitable material, as cast iron, and in a horizontal plane its outer surface has an elliptical shape. As may be seen in Fig. 2, the coupling 15 comprises a cast metal shell having therethrough front and rear lower openings 32 and 33 and upper front and rear outlet openings 34 and 35, said front openings communicating with each other and said rear openings communicating with each other, and an air passage between said front openings and said rear openings. This passage has a flap valve or metal leaf 28 mounted therein, and manually controllable from the dash of the vehicle. The opening 32, located at the lower front portion of the coupling, admits the manifold heater pipe 13, and the opening 33, located at the lower rear portion of the coupling, admits the hot water heater pipe 19, the two pipes being admitted at some convenient angle as shown in Fig. 2. There are two openings in the top of the coupling; top opening 34 is located above opening 32 and admits the lower portion of the front conduit 20; top opening 35 is located above opening 33 and admits the lower portion of the rear conduit 21.

The rear conduit 21, which fits into the circular opening 35 in the top of the coupling, is formed to conduct warm air from the coupling up through an opening in the top edge of the instrument board. As shown in the drawings, the conduit may be formed into two wings or branches 36 and 37 for directing the warm air to portions of the windshield where it is most needed. Above the openings in the top of the instrument board, the conduits end in vents 22 and 23 which direct the warm air against the inside of the windshield. It should be noted that the warm air emitted by these vents is effective in heating the interior of the vehicle as well as in heating the windshield. The front conduit 20, which fits into the circular opening 34 in the top of the coupling, conducts warm air from the coupling to one or more vents in the cowl. Preferably, this front conduit is formed into branches 38 and 39 similar to those described in connection with the rear conduit opening into vents 24 and 25.

The vents are preferably of rectangular shape and are formed of sheet metal pieces which may be raised and lowered by being rotated about an axis along their longitudinal edge. The means for such operation may be similar to that used in connection with the ordinary cowl ventilator. In order that all of the warm air may be directed against the windshield, it is best that the vents be located as near the windshield as is convenient. Also, the vents are equipped with depending metal tabs or ears which extend downward at the sides in such a way that when the vents are open, the warm air supplied to the vents cannot escape in a side direction, but flows against the windshield, and when the vents are closed, these tabs or ears will disappear below the level of the cowling.

From the crotch formed by the two conduit branches 36 and 37 and 38 and 39, there may be small inside projections or baffles 26 and 27 which serve to cause the proper proportion of the warm air to be directed into each branch of the conduit.

The valve mechanism for directing and controlling the warm air supplied is located at coupling 15. Inside coupling 15 is a metal leaf 28 so shaped as to effectively close the air passage between the front and rear openings, said metal leaf being secured to a pin 29 which extends transversely through the coupling at its lower central portion and is rotatable about its own axis. Outside the coupling pin 29 is secured to a small arm 30, the end of which is fastened to a push rod 31 extending back through the instrument board.

It will be seen that when the push rod 31 is pushed forward, pin 29 will rotate in a counterclockwise direction, causing the metal leaf 28 to move backward until it covers the hot water heater pipe 19, thus effectively cutting off the supply of warm air from the hot water heater. In this position, the passage between openings 32, 34 and 35 is left free, and the manifold heater is supplying warm air to both front and rear conduits and consequently to both sides of the windshield. When the push rod 31 is pulled back, the pin 29 will rotate in a clockwise direction causing the metal leaf 28 to move forward until it covers manifold heater pipe 13, thus cutting off the supply of warm air from the manifold heater. In this position, the passage between openings 33, 34 and 35 is left clear, so the hot water is supplying warm air to both front and rear conduits and consequently to both sides of the windshield. When the push rod 31 is left in a central position, the metal leaf 28 will be left in an upright position as shown in Fig. 2, closing the passage between the front and rear openings, the communication between openings 33 and 35 being unobstructed as also that between openings 32 and 34. So in this position, the hot water heater will be supplying warm air by way of the rear conduit to the inside of the windshield, and the manifold heater will be supplying warm air by way of the front conduit to the outside of the windshield.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A device for supplying warm air to the surfaces of the windshield of a motor vehicle, including: a source of warm air; a second source of warm air; means adjacent the outer surface of said windshield for directing air against said windshield; means adjacent the inner surface of said windshield for directing air against said windshield; and means whereby warm air from either of said sources may be supplied to both of said last-mentioned means.

2. A device for supplying warm air to the surfaces of the windshield of a motor vehicle, including: a source of warm air; a second source of warm air; means adjacent the outer surface of said windshield for directing warm air against said windshield; a nozzle adjacent the inner surface of said windshield; a coupling member connecting said means adjacent the outer surface of said windshield and said nozzle to both of said sources of warm air; and valve means within said coupling whereby warm air from either of said sources may be directed against the surfaces of said windshield.

3. A device for supplying warm air to the surfaces of the windshield of a motor vehicle, including: a source of warm air; a second source of warm air; means adjacent the outer surface of said windshield for directing warm air against said windshield; a nozzle adjacent the inner surface of said windshield; a coupling member having two lower openings and two upper openings through the walls thereof and an interior passage; a pipe leading from said first source to one of said lower openings; a second pipe leading from said second source to the other lower opening; a conduit leading from one of said upper openings to said means adjacent said windshield; a second conduit leading from the other upper opening to said nozzle; and a leaf pivotally mounted in said passage, whereby warm air may be supplied to both of said conduits from either of said sources.

4. Apparatus of the character claimed in claim 3, wherein said leaf is manually controllable from a point adjacent the dash of said vehicle.

5. A device for supplying warm air to the surfaces of the windshield of a motor vehicle driven by a water-cooled internal combustion engine, including: a manifold heater adjacent the exhaust manifold of said engine, whereby air in said heater is warmed by the heat from the exhaust gases of said engine; a hot water heater having means for forcing air therethrough, whereby said air is warmed by the heat from the water circulating in the cooling system of said engine; air-directing means adjacent the front of said windshield, said means being adapted to direct warm air supplied thereto against said windshield; a nozzle adjacent the back of said windshield; a coupling-member having two lower openings and two upper openings through the walls thereof, and having an interior passage communicating with all of said openings; pipes connecting said sources of warm air with said lower openings; a conduit connecting said air-directing means to one of said upper openings; a second conduit connecting said nozzle to the other upper opening; a leaf centrally located in said passage and hinged at one edge, said leaf when vertical being adapted to close the center of said passage, whereby said air-directing means is supplied with warm air only by said manifold heater and said nozzle is supplied with warm air only by said hot water heater, said leaf also being adapted to close either of said lower openings and open said passage, whereby both said air-directing means and said nozzle are supplied with warm air by one of said heaters.

6. A device for supplying warm air to the surfaces of the windshield of a motor vehicle, including: a source of warm air; a second source of warm air; means adjacent the outer surface of said windshield for directing air against said windshield; means adjacent the inner surface of said windshield for directing air against said windshield; and means whereby warm air from either of said sources may be supplied to either of said last-mentioned means.

JOHN MUVRIN.